(12) United States Patent
Le Meur et al.

(10) Patent No.: US 9,713,855 B2
(45) Date of Patent: Jul. 25, 2017

(54) METHOD AND DEVICE FOR DRILLING A WORKPIECE WITH LASER PULSES

(71) Applicant: SNECMA, Paris (FR)

(72) Inventors: Yves Le Meur, Coussay les Bois (FR); Jean-Baptiste Mottin, Poitiers (FR)

(73) Assignee: SNECMA, Paris (FR)

( * ) Notice: Subject to any disclaimer, the term of this patent is extended or adjusted under 35 U.S.C. 154(b) by 347 days.

(21) Appl. No.: 14/404,513

(22) PCT Filed: May 30, 2013

(86) PCT No.: PCT/FR2013/051214
§ 371 (c)(1),
(2) Date: Nov. 28, 2014

(87) PCT Pub. No.: WO2013/178950
PCT Pub. Date: Dec. 5, 2013

(65) Prior Publication Data
US 2015/0165561 A1    Jun. 18, 2015

(30) Foreign Application Priority Data

Jun. 1, 2012  (FR) ..................... 12 55128

(51) Int. Cl.
*B23K 26/38*   (2014.01)
*H01S 3/042*   (2006.01)
(Continued)

(52) U.S. Cl.
CPC ...... *B23K 26/1435* (2013.01); *B23K 26/0622* (2015.10); *B23K 26/382* (2015.10);
(Continued)

(58) Field of Classification Search
CPC  B23K 26/062; B23K 26/0622; B23K 26/382; B23K 26/389; H01S 3/1028; H01S 3/0407

See application file for complete search history.

(56) References Cited

U.S. PATENT DOCUMENTS

| 3,806,829 A | 4/1974 | Duston et al. |
| 4,740,981 A | 4/1988 | Kleisle et al. |

(Continued)

FOREIGN PATENT DOCUMENTS

| DE | 10063309 A1 | 7/2002 |
| EP | 0817338 A2 | 1/1998 |

(Continued)

OTHER PUBLICATIONS

International Search Report issued Oct. 17, 2013 in PCT/FR2013/051214 filed May 30, 2013.

*Primary Examiner* — Geoffrey S Evans
(74) *Attorney, Agent, or Firm* — Oblon, McClelland, Maier & Neustadt, L.L.P.

(57) ABSTRACT

A method of drilling a part, or a turbine engine part, by a pulse laser generator including a cavity in which there is mounted a solid bar for generating laser pulses, the method including determining values of a plurality of operating parameters of the laser generator for forming orifices of predetermined diameter in the part, and taking account, among the parameters, of a setpoint value for the temperature of the laser cavity, which value is determined as a function of characteristics of the orifices to be drilled.

10 Claims, 4 Drawing Sheets

(51) Int. Cl.
  *B23K 26/14* (2014.01)
  *H01S 3/093* (2006.01)
  *H01S 3/102* (2006.01)
  *B23K 26/0622* (2014.01)
  *B23K 26/382* (2014.01)
  *B23K 101/00* (2006.01)
  *H01S 3/04* (2006.01)
  *H01S 3/06* (2006.01)
  *H01S 3/16* (2006.01)

(52) U.S. Cl.
  CPC .......... *B23K 26/389* (2015.10); *H01S 3/093* (2013.01); *H01S 3/1028* (2013.01); *B23K 2201/001* (2013.01); *H01S 3/0407* (2013.01); *H01S 3/061* (2013.01); *H01S 3/1643* (2013.01)

(56) References Cited

U.S. PATENT DOCUMENTS

| | | | | |
|---|---|---|---|---|
| 5,151,909 A | * | 9/1992 | Davenport | B23K 26/06 359/326 |
| 5,392,303 A | * | 2/1995 | Shiozawa | H01S 5/06808 372/26 |
| 5,757,842 A | * | 5/1998 | LaPlante | H01S 3/102 372/101 |
| 6,021,151 A | | 2/2000 | Eguchi et al. | |
| 6,078,604 A | | 6/2000 | Eguchi et al. | |
| 6,122,300 A | * | 9/2000 | Freiberg | H01S 3/042 372/25 |
| 6,266,352 B1 | | 7/2001 | Eguchi et al. | |
| 2004/0151217 A1 | * | 8/2004 | Yeik | A61B 18/20 372/25 |
| 2006/0096956 A1 | * | 5/2006 | Indou | G05B 19/056 219/121.61 |
| 2012/0000893 A1 | * | 1/2012 | Broude | B23K 26/032 219/121.69 |
| 2012/0298650 A1 | * | 11/2012 | Nowak | B23K 26/03 372/28 |

FOREIGN PATENT DOCUMENTS

| | | | |
|---|---|---|---|
| EP | 2457685 A1 | | 5/2012 |
| JP | 10-94887 A | * | 4/1988 |
| JP | 2010-212561 A | * | 9/2010 |
| JP | 2011-049376 A | * | 3/2011 |
| JP | 2011-228537 A | * | 11/2011 |
| WO | WO-2012/036008 A1 | * | 3/2012 |

* cited by examiner

METHOD AND DEVICE FOR DRILLING A WORKPIECE WITH LASER PULSES

BACKGROUND OF THE INVENTION

Field Of The Invention

The invention relates to a method of drilling a part, in particular a turbine engine part, by means of a pulse laser.

Description Of The Related Art

Numerous turbine engine parts are drilled in order to form orifices, e.g. for passing a flow of cooling air. This applies in particular to turbine vanes and blades, and also to combustion chamber walls, which walls may include several thousands of cooling orifices.

In order to ensure effective cooling of these parts and in order to avoid shortening their lifetimes, the drilled orifices must present specific shapes, and they must not present microcracking on their internal walls. Furthermore, the technology used for drilling must affect the material soundness of the parts as little as possible.

Three different technologies are known for drilling a turbine engine part for the purpose of forming cooling orifices: drilling by means of a sharp tool, electrical discharge machining (EDM), and laser pulse drilling.

Drilling by means of a sharp tool is not appropriate for making orifices of small diameter (e.g. lying in the range 0.4 millimeters (mm) to 1.5 mm). EDM drilling is suitable for making orifices of small size. Nevertheless, because that type of drilling is relatively expensive to implement, it is used only for drilling parts having a small number of cooling orifices.

Drilling by means of laser pulses (e.g. using a YAG type laser) also makes it possible to drill orifices of small size. Nevertheless, prior art laser devices are used for making only a small number of successive orifices, since they are not stable, so the quality and the repeatability of the shapes of the orifices decrease after such devices have been in use for a certain length of time. By way of example, it has been found that when a laser drilling device is used for making orifices of circular section, the orifices that are drilled after the device has been in use for a certain length of time present a section that is somewhat elliptical. That device is therefore used for relatively short durations only, and it needs to be rested for relatively long periods of time between two successive uses.

A pulse laser generally comprises a cavity having mounted therein a solid bar for generating laser pulses. Typically, the bar is elongate in shape and forms an amplifying medium into which photons are emitted from at least one flash lamp housed in the cavity. Two mirrors, one of which is partially reflecting, are arranged at the longitudinal ends of the bar. The laser cavity also has a temperature sensor that is connected to detection means for warning an operator when the temperature of the cavity reaches a certain threshold. In order to avoid the laser cavity reaching the threshold, it is cooled while it is in operation.

In the prior art, the temperature of the laser cavity is thus not taken into account for controlling or programming the laser generator. The above-mentioned cavity threshold temperature is constant, regardless of the characteristics of the part or of the orifices to be drilled, and it is determined merely for the purpose of guaranteeing an optimum lifetime for the laser generator.

BRIEF SUMMARY OF THE INVENTION

An object of the invention is to provide a simple, effective, and inexpensive solution to the above-mentioned problem associated with using a pulse laser for drilling orifices in a part.

The invention provides a method of drilling a part, in particular a turbine engine part, by means of a pulse laser generator having a cavity (of controlled temperature) in which there is mounted a solid bar enabling a laser beam to be generated.

To this end, the invention provides a method of drilling a part, in particular a turbine engine part, by means of a pulse laser generator comprising a cavity in which there is mounted a solid laser pulse generator bar, the method comprising a step consisting in determining the values of a plurality of operating parameters of the laser generator for forming orifices of predetermined diameter in the part, and the method being characterized in that it consists in determining a setpoint value for the cavity temperature of the laser generator as a function of characteristics of the orifices to be made and/or of the material of the part to be drilled, and in servo-controlling the cavity temperature to this setpoint value while drilling the orifices.

The inventors have found that the temperature of the cavity of the laser generator in which the bar is housed has an influence on the power delivered by the laser generator and thus on the geometry of the orifices drilled and also on the appearance of microcracks in the internal walls of those orifices.

By way of example, the operating parameters of the laser generator are the pulse frequency (F), the number of pulses, the duration of one pulse (Tp), and/or the percentage of the maximum power of the laser generator (H %). This power parameter H % is a setpoint that enables the laser generator to be caused to operate at a fraction of its maximum power or at full power (H %=100), e.g. by varying the power supply to its flash lamps. It may be advantageous to select a parameter H % that is relatively high (at least greater than 25%) in order to ensure stability of the cavity and of the power of the laser beam.

According to the invention, a predetermined temperature for the cavity is added to the parameters that need to be taken into account when controlling the laser, and this temperature is maintained substantially constant throughout drilling.

The method preferably includes a step consisting in determining a setpoint value for the temperature of the cavity at which the laser generator is tuned and delivers maximum energy for the predetermined operating parameters. The drilling is thus performed at a cavity temperature that serves to tune the laser. This temperature needs to be guaranteed to within ±3° C. The laser beam shutter may be capable of being activated only if the temperature setpoint is satisfied. For constant process parameters, any variation in the temperature of the laser cavity (outside the above-specified range) may have the impact of "de-tuning" the laser generator.

The temperature of the cavity of the generator is regulated around a setpoint value while the laser is in operation, thereby guaranteeing that the drilling is of good quality and repetitive. The laser generator can be used for periods that are longer than in the prior art, and it needs to be rested only if it is found difficult or impossible to maintain the temperature of the cavity around the setpoint value (with the risk of this happening nevertheless being small when means are used for cooling the cavity).

The invention differs from the prior art in particular in that the temperature of the cavity of the generator constitutes an adjustable operating parameter that is controlled and regulated in order to optimize the characteristics of the drilling.

Regulating the temperature consists in keeping it as close as possible to the setpoint value (which depends in particular on the characteristics of the part such as its material, and which can thus vary from one drilling operation to another), with this being different from the prior art in which the cavity is cooled in order to avoid exceeding a maximum operating temperature, with the operating temperature being allowed to take any value that is lower than the maximum value and with the cooling of the cavity remaining unchanged so long as the maximum value is not reached. In the prior art, the laser generator is rested as soon as the temperature of its cavity reaches this maximum value.

The invention thus consists in particular in setting up servo-control of the temperature of the laser cavity in order to optimize the geometry and the characteristics of drilled orifices and in order to enable the laser generator to be used for a longer duration, while conserving the results of this optimization.

In order to drill orifices, the laser generator is used in tuned mode, i.e. by optimizing the process parameters (Tp, F, H %) so as to obtain maximum energy at the outlet from the laser generator. Any variation in the temperature of the cavity of the laser generator will have the effect of "de-tuning" the generator.

The inventors have also observed that it is possible to have an influence on the geometry of drilled orifices by varying the temperature of the cavity.

The temperature of the cavity may be regulated to within ±3° C. about the setpoint value. The setpoint value for the cavity temperature lies for example in the range 25° C. to 40° C. The setpoint value is preferably determined so that the orifices are through orifices and of section that is circular in shape.

The temperature of the cavity may be regulated by means of a system for cooling the cavity by circulating a cooling fluid in the vicinity of or inside the cavity. By way of example, the cooling of the cavity may be optimized by varying the flow rate and the temperature of the cooling fluid.

The part may be a blade or a vane of a turbine or a wall of a combustion chamber of a turbine engine.

By way of example, the laser is a YAG type laser or any other type of pulse laser for which it is possible to regulate the temperature of the laser cavity.

The present invention also provides a device for drilling a part, in particular a turbine engine part, by means of a pulse laser generator having a cavity in which there is mounted a solid laser pulse generator bar, a cooling system for cooling the cavity by circulating a cooling fluid around the cavity, and control means for controlling operating parameters of the laser, the device being characterized in that it includes means for servo-controlling the cavity temperature to a setpoint value as a function of characteristics of the drilling to be performed, by varying the flow rate and the temperature of the cooling fluid.

BRIEF DESCRIPTION OF THE SEVERAL VIEWS OF THE DRAWINGS

The invention can be better understood and other details, characteristics and advantages of the invention appear on reading the following description made by way of nonlimiting example and with reference to the accompanying drawings, in which.

DETAILED DSCRIPTION OF THE INVENTION

Figure 1:
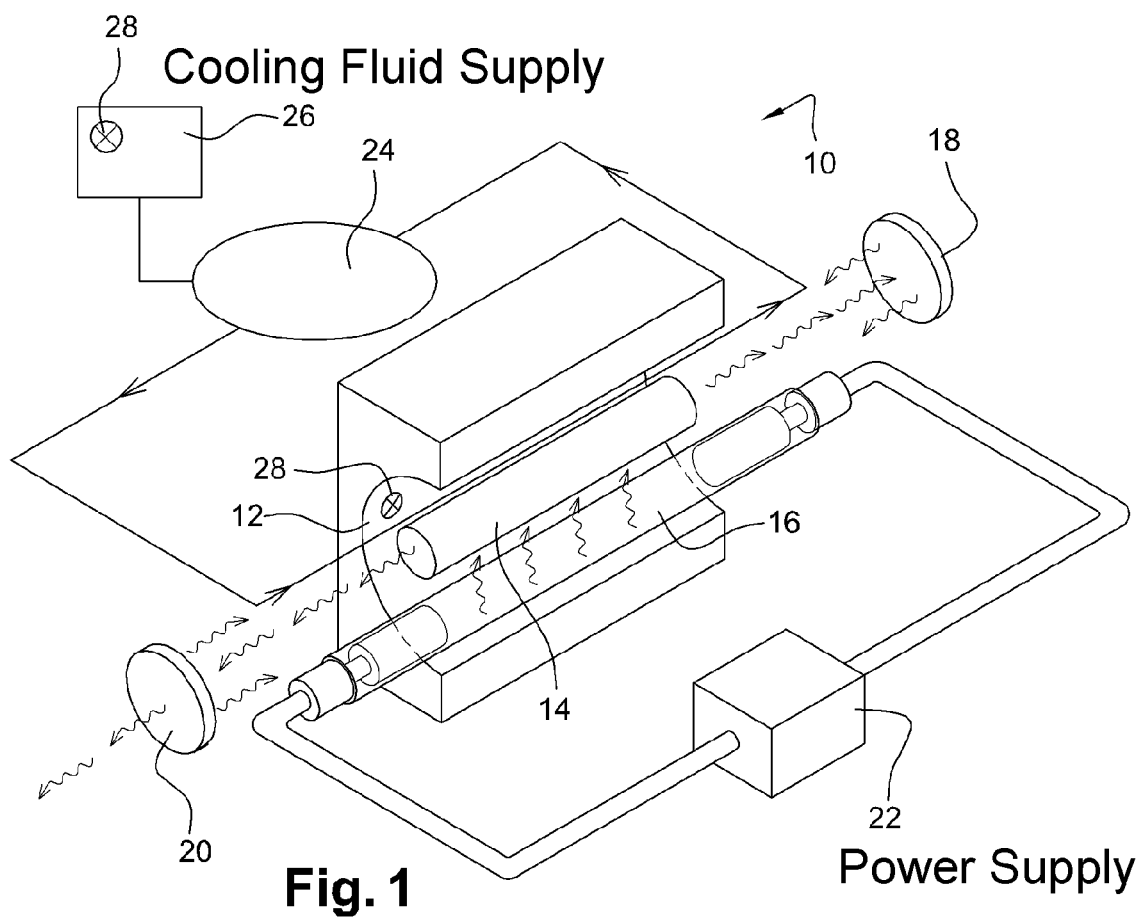
FIG. 1 is a fragmentary diagrammatic view in perspective of a pulse laser.

Reference is made initially to FIG. 1, which shows a portion of a pulse laser generator 10, e.g. of the YAG type, the generator 10 comprising a cavity 12 having mounted therein a solid bar 14 and flash lamps 16 for exciting the solid bar.

The solid bar 14 is in the form of an elongate cylinder and it extends parallel to a longitudinal axis of the cavity 12, which is also in the form of an elongate cylinder in the example shown. By way of example, the bar 12 is a crystal bar. Respective mirrors 18, 20 are arranged at each of the longitudinal ends of the bar, one of these mirrors, 20, being of the partially reflecting type.

By way of example, the flash lamps 16 are two in number (only one of them being shown in FIG. 1), each flash lamp being connected to an electrical power supply 22 and being configured to emit photons into the cavity. In this example, the lamps 16 are elongate in shape. They extend parallel to the longitudinal axis of the cavity, and by way of example they are situated at opposite ends of the bar.

A pulse laser drilling device conventionally comprises a laser generator 10 of the above-described type, a cooling system for cooling the cavity 12, and control means for controlling the operating parameters of the laser generator.

The laser cavity 12 is cooled by circulating a cooling fluid inside the cavity, with the bar 14 and the flash lamps 16 being immersed in the fluid. The laser generator 10 includes a heat exchanger 24 connected to means for circulating cooling fluid in the cavity, and to a supply 26 of cooling fluid.

The laser generator 10 also includes temperature sensors 28 of the thermocouple type, for example, which sensors are housed in the cavity 12 and in the supply 26 of cooling fluid.

The operation of a pulse laser generator 10 of the above-described type is well known to the person skilled in the art.

Figure 2:
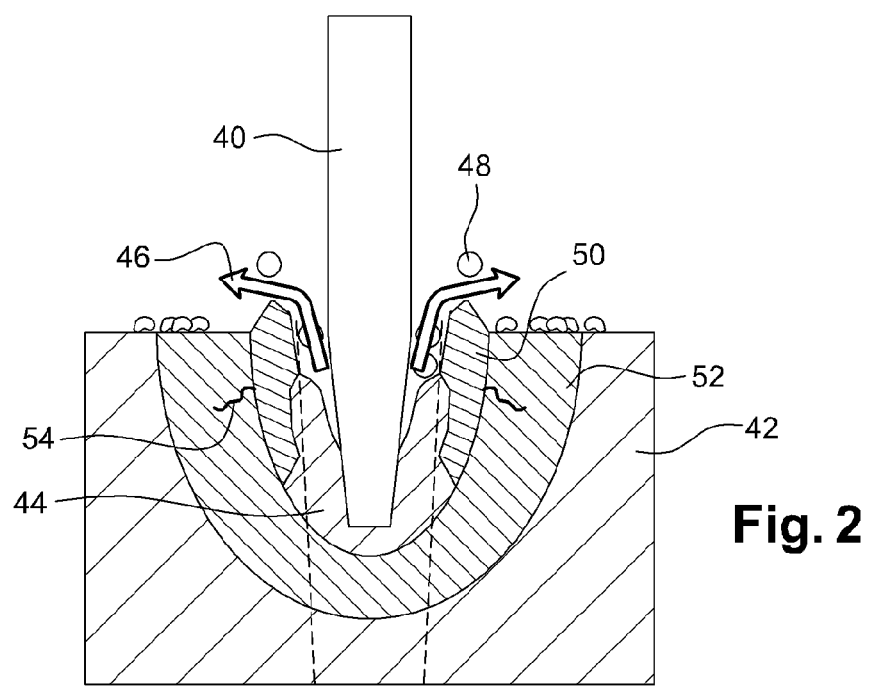
FIG. 2 is a fragmentary diagrammatic view in section of a part and of a laser beam for drilling the part.

FIG. 2 is a diagrammatic section view of a part being drilled by laser pulses, e.g. by means of the above-described laser generator 10. Reference 40 designates the beam emitted by the generator, this beam being directed substantially perpendicularly to the surface of the part 42 for drilling. The beam 40 is constituted by a plurality of successive pulses that cause the material of the part to melt (molten zone 44), some of this molten material being vaporized (reference 46), and some being ejected from the molten zone (reference 48), the remainder of the material (reference 50) remaining on the internal walls of the orifice that is being formed. The peripheral zone 52 extending around the orifice being drilled is subjected to relatively high levels of thermal stress. This zone 52, which is referred to as the "thermally affected zone" (TAZ), is a site in which microcracks 54 form during drilling.

Figure 3:
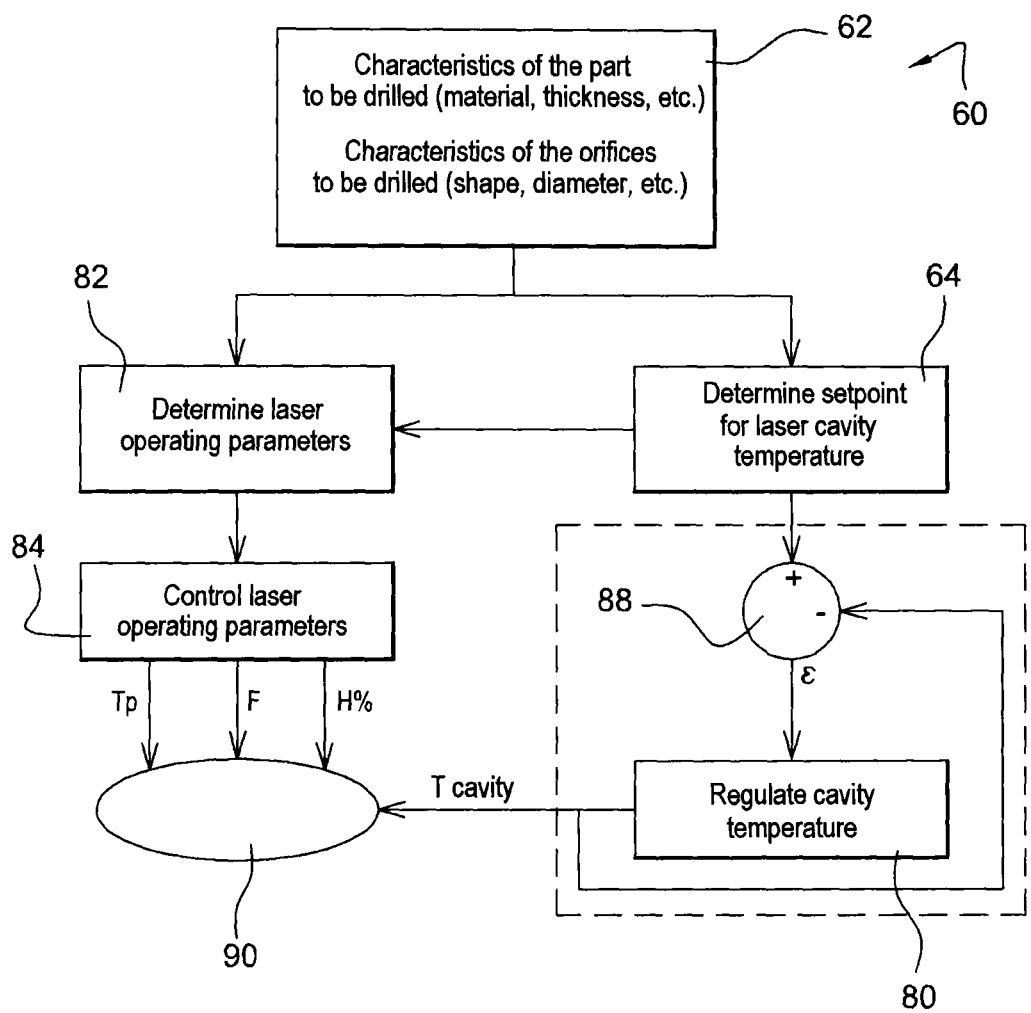
FIG. 3 is a flowchart showing the steps of the method of the invention for drilling a part with laser pulses.

FIG. 3 is a flowchart showing the steps of the method 60 of the invention for drilling a part with laser pulses.

A first step 62 of the method consists in determining the characteristics of the part for drilling, and also the characteristics of the orifices to be formed in the part. The characteristics of the part comprise in particular its material (e.g. an alloy based on nickel or cobalt), and the thickness of the wall for drilling in the part (generally lying in the range 0.8 mm to 15 mm). These characteristics may include data about numerous other items such as the shape and the dimensions of the part, the presence of another wall in the vicinity of the part, which other wall is not to be affected and/or drilled during the drilling, the presence of a coating (e.g. a thermal barrier) on the wall for drilling, etc.

The characteristics of the orifices for drilling include in particular the shape or the geometry of such orifices, their dimensions, the angle between the longitudinal axis of each orifice and a normal to the surface of the part, the depths of the orifices, etc. In general, these orifices are generally circularly cylindrical in shape, and they thus have a section of circular shape with a diameter lying in the range 0.4 mm to 1.5 mm, for example. The angle extending between the axis of each orifice and a normal to the surface of the part generally lies in the range 0° to 70°. The depth of an orifice is equal to the thickness of the wall that is to be drilled when the orifice passes through the wall (i.e. when it is a through orifice).

At least some of the above-mentioned characteristics are used for determining a temperature setpoint for the cavity 12 of the laser generator (step 64). This applies for example to the geometry of the orifices that are to be drilled and to the material of the part. The temperature of the cavity may be determined on the basis of these characteristics by means of a graph of the kind shown in FIG. 4.

Figure 4:
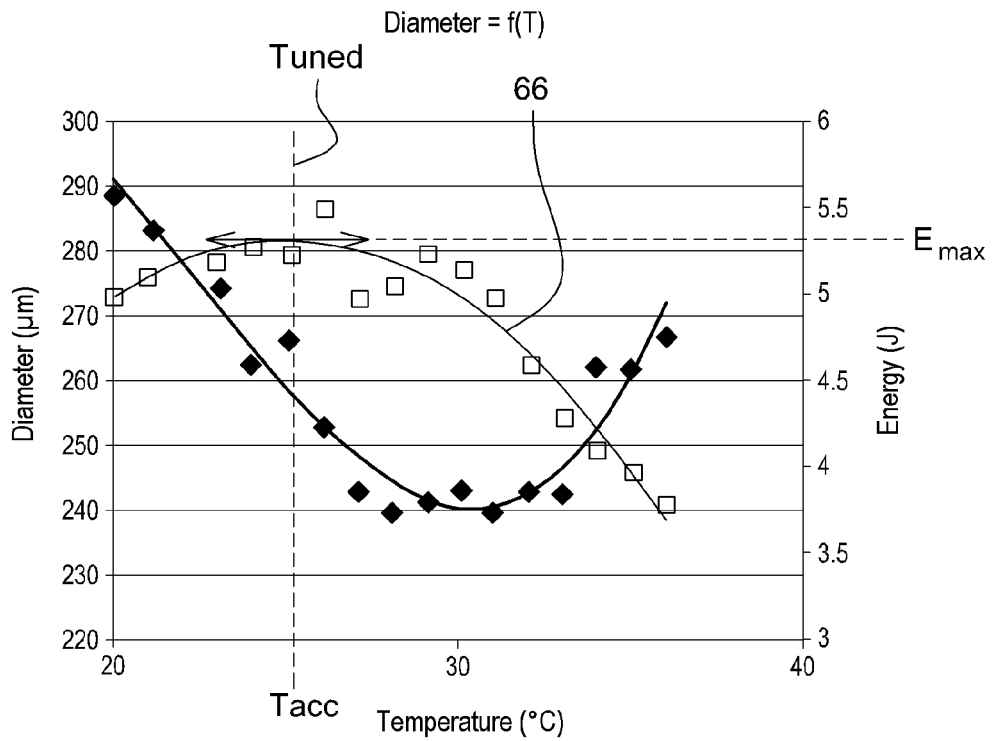
FIG. 4 is a graph showing how the diameter of drilled orifices varies and the energy of the laser beam vary as a function of the temperature of the laser cavity in which the laser pulse generator bar is mounted.

For given operating parameters of the laser generator, such as Tp, F, and H %, which are described below, the graph of FIG. 4 shows the way the energy per laser pulse (plotted up the right-hand ordinate axis) and the diameter D of the orifices (plotted up the left-hand ordinate axis) vary as a function of the temperature (T) of the cavity 12. It can be seen that the curve 66 plotting E=f(T) presents a maximum Emax at the tuned temperature (Tacc) of the cavity, i.e. at the temperature of the cavity at which the laser generator is tuned, as explained above.

As a function of the material, of the desired drilling diameter, of its depth, and of its morphology (section of cylindrical, elliptical, . . . shape), it is necessary to identify values for the parameters Tp, F, H % and the temperature T of the cavity that enable these specifications to be satisfied. In the example shown, the tuning parameters for the laser generator are Tp=1 milliseconds (ms), F=35 hertz (Hz), H=86%, and T=25° C.

Graphs of this type can be drawn up beforehand for each of the materials of parts that are to be drilled by laser pulses using the method of the invention. When it is possible that a given part might be made out of a cobalt-based metal alloy or out of a nickel-based metal alloy, then it may be necessary to prepare a graph of this type for each of these alloys.

This optimum temperature constitutes a setpoint around which the temperature of the cavity is regulated during drilling (step 80) in order to guarantee the above-specified characteristics for the orifices (geometry, diameter, etc.). The temperature of the laser cavity is thus servo-controlled.

More precisely, the temperature of the cavity 12 of the laser may be regulated as follows. In addition to the conventional equipment of the prior art (laser generator 10, control means, etc.), the drilling device of the invention comprises means for regulating the temperature of the laser cavity. These servo-control or regulation means comprise a comparator 88 that receives as input the measured temperature of the cavity and the setpoint value for this temperature, and that determines whether these values are sufficiently close together (such that their difference is less than or equal to an error margin $\epsilon$ of ±1° C., for example). In the event of the temperature of the cavity being too high relative to the setpoint value, the output signal from the comparator is applied to means for controlling the flow rate and/or the temperature of the cooling fluid in order to increase the cooling of the cavity and thus reduce its temperature. In the event of the temperature of the cavity being too low relative to the setpoint value, the comparator causes the cooling of the cavity to be reduced in order to increase its temperature. This regulation of the temperature of the cavity takes place throughout the duration of drilling, and the comparator 88 can perform the above-mentioned comparisons at regular intervals, e.g. once every second.

The method also includes steps 82 and 84 consisting in determining the operating parameters of the laser generator for the setpoint value (T1) of the laser cavity temperature, and for controlling these parameters during the drilling.

By way of example, the operating parameters of the laser generator are the pulse frequency (F), the number of pulses, the duration of one pulse (Tp), and the percentage of the maximum power of the laser generator (H %).

Figure 5:
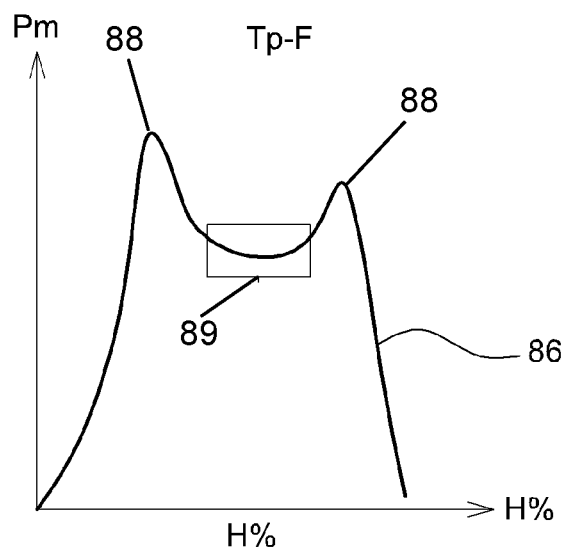
FIG. 5 is a graph showing how the mean power of the laser beam varies as a function of the percentage of the maximum power of the laser generator.

The graph of FIG. 5 shows how the mean power (Pm) of the laser beam varies as a function of the percentage of the maximum power (H %) of the laser generator. It can be seen that the curve 86 presents two peaks 88 that are spaced apart by a plateau 89. The plateau shows that, for a given range of values for H %, the power Pm remains relatively constant. This type of graph can be prepared for various materials and thicknesses, and it makes it possible to determine a range of values for H % for which the mean power of the laser beam is substantially constant. The graph of FIG. 5 is prepared for given pulse duration (Tp) and pulse frequency (F).

Figure 6:
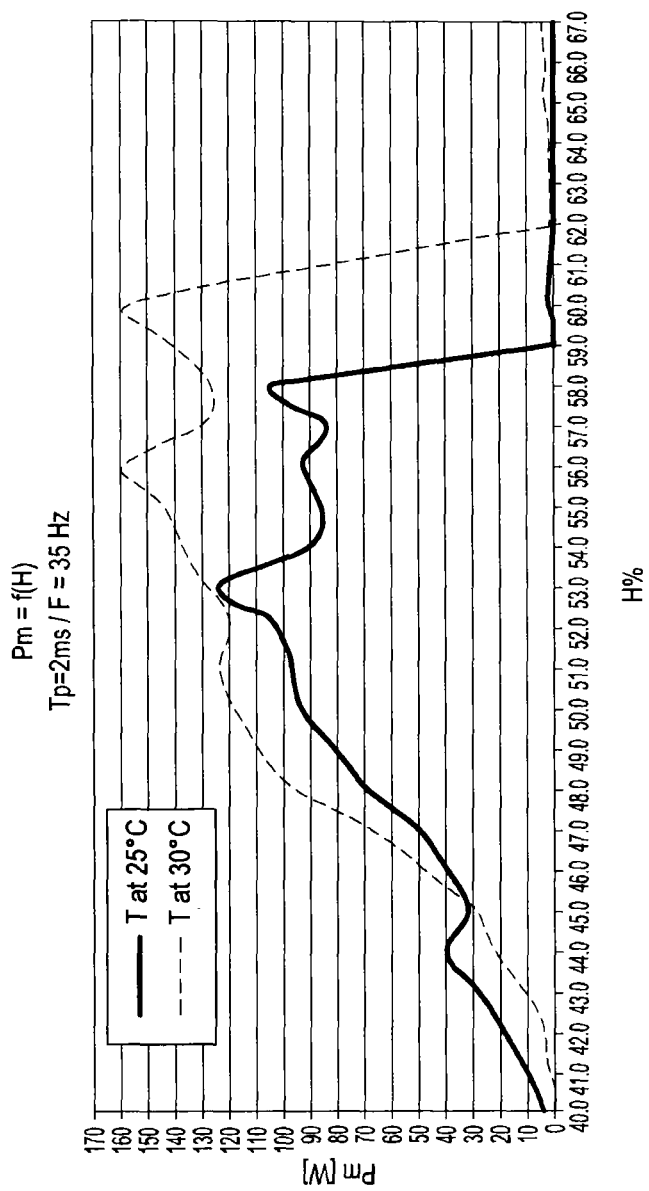
FIG. 6 is a graph similar to that of FIG. 5 and shows the influence of the temperature of the cavity on of the mean power of the laser beam.

The graph of FIG. 6 is similar to the graph of FIG. 5 and shows how the mean power (Pm) of a laser beam varies as a function of the percentage of the maximum power of the laser generator (H %) for two different cavity temperatures (25° C. and 30° C.). In the example shown, the parameters Tp and F are respectively 2 ms and 35 Hz. For a given setpoint parameter H %, it is found that the mean power Pm varies as a function of the cavity temperature. For H %=50, the mean power of the laser beam is 95 watts (W) for a cavity temperature of 25° C., and 120 W for a cavity temperature of 30° C. This graph thus shows the influence of the temperature of the cavity on the mean power, and thus on the energy of the laser beam, even when the other operating parameters (Tp, F, H %) of the laser generator are kept constant.

The laser generator 90 is for being controlled by controlling the above-mentioned parameters (Tp, F, H %, etc.), and also by regulating the temperature of the cavity, as explained above, throughout the drilling operation.

The invention claimed is:

1. A method of drilling a part by a pulse laser generator including a cavity in which there is mounted a solid laser pulse generator bar, the method comprising:
   determining values of a plurality of operating parameters of the laser generator for forming orifices of predetermined diameter in the part;
   determining a setpoint value for cavity temperature of the laser generator as a function of at least one of characteristics of orifices to be made and a material of the part to be drilled; and
   servo-controlling the cavity temperature to the setpoint value while drilling the orifices.

2. A method according to claim 1, wherein the operating parameters of the laser generator are at least two of a pulse frequency, a number of pulses, a duration of one pulse, and a percentage of maximum power of the laser generator.

3. A method according to claim 1, wherein the temperature of the cavity is regulated to within ±3° C. about the setpoint value.

4. A method according to claim 1, wherein the setpoint value is determined so that the orifices are through orifices and with a section that is circular in shape.

5. A method according to claim 1, further comprising determining a setpoint value for the temperature of the cavity at which the laser generator is tuned and delivering maximum energy for the predetermined operating parameters.

6. A method according to claim 1, wherein the setpoint value for the cavity temperature is in a range of 25° C. to 40° C.

7. A method according to claim 1, wherein the temperature of the cavity is regulated by a system for cooling the cavity by circulating a cooling fluid in a vicinity of or inside the cavity.

8. A method according to claim 1, wherein the part is a blade or a vane of a turbine or a wall of a combustion chamber of a turbine engine.

9. A method according to claim 1, wherein the laser generator is a YAG laser.

10. A device for drilling a part comprising:
 a pulse laser generator including a cavity in which there is mounted a solid laser pulse generator bar;
 a cooling system for cooling the cavity by circulating a cooling fluid in a vicinity of or inside the cavity, the cooling system including a heat exchanger and a supply of the cooling fluid;
 a controller configured to control operating parameters of the laser; and
 a servo-controller including a comparator, the servo-controller being configured to control the cavity temperature of the generator to a setpoint value as a function of characteristics of the drilling to be performed, by varying at least one of a flow rate and a temperature of the cooling fluid.

* * * * *